United States Patent
Wood et al.

(10) Patent No.: US 7,296,750 B2
(45) Date of Patent: *Nov. 20, 2007

(54) INERTIAL DRIVE SCANNING ARRANGEMENT AND METHOD

(75) Inventors: Frederick F. Wood, Medford, NY (US); Dmitriy Yavid, Stony Brook, NY (US)

(73) Assignee: Symbol Technologies, Inc., Hortsville, NY (US)

( * ) Notice: Subject to any disclaimer, the term of this patent is extended or adjusted under 35 U.S.C. 154(b) by 10 days.

This patent is subject to a terminal disclaimer.

(21) Appl. No.: 10/975,888

(22) Filed: Oct. 27, 2004

(65) Prior Publication Data

US 2005/0121522 A1    Jun. 9, 2005

Related U.S. Application Data

(63) Continuation-in-part of application No. 10/387,878, filed on Mar. 13, 2003, now Pat. No. 7,182,262.

(51) Int. Cl.
*G02B 5/08* (2006.01)

(52) U.S. Cl. .................. 235/462.36; 235/462.38; 235/462.4

(58) Field of Classification Search ........... 235/462.36, 235/462.38, 462.4, 462.43, 462.01
See application file for complete search history.

(56) References Cited

U.S. PATENT DOCUMENTS 5,579,148 A * 11/1996 Nishikawa et al. ......... 359/214
5,594,232 A * 1/1997 Giordano ............... 235/462.43
6,129,282 A * 10/2000 Reddersen ............. 235/462.45
6,295,154 B1 9/2001 Laor et al.
6,672,732 B1 1/2004 Niendorf et al.
2004/0004775 A1* 1/2004 Turner et al. ............... 359/877
2004/0027449 A1 2/2004 Turner et al.
2004/0178273 A1* 9/2004 Wood et al. .......... 235/462.36

OTHER PUBLICATIONS

*The 2-Dimensional Micro Scanner Integrated With PZT Thin Film Actuator*, Transducers '97, 1997 International Conference on Solid-State Sensors and Actuators, Tatsuo Kawabata, et al., Chicago, Jun. 16-19, 1997, pp. 339-342.
*Two Dimensional Silicon Micromachines Optical Scanner Integrated With Photo Detector and Piezoresistor*, Transducers '95—Eurosensors IX, The 8th International Conference on Solid-State Sensors and Actuators, and Eurosensors IX, Stockholm, Sweden, Jun. 25-29, 1995, pp. 293-296.
*A Novel Asymmetric Silicon Micro-Mirror for Optical Beam Scanning Display*, K. Yamada, et al., ULSI Application Research Laboratory, Silicon Systems Research Laboratories, NEC Corporation, 1998 IEEE, pp. 110-115.
*A Novel High Resolution Optical Scanner Actuated by Aerosol Deposited PZT Films*; 2003 IEEE, Mar. 2003, N. Asai, et al., pp. 247-250.

(Continued)

*Primary Examiner*—Ahshik Kim
(74) *Attorney, Agent, or Firm*—Kirschstein, et al.

(57) ABSTRACT

A light scanning arrangement includes a frame or a base plate directly moved by an inertial drive in order to oscillate a scan element supported by a hinge on the frame at high scan rates and with minimal electrical power consumption.

17 Claims, 6 Drawing Sheets

OTHER PUBLICATIONS

*Design and Fabrication of 1D and 2D Micro Scanners Actuated by Double Layered PZT Bimorph Beams*, 1D-6-34, J. Tsaur, et al., National Institute of Advanced Industrial Science and Technology, pp. 204-205.

*Dynamic and Static Behavior of Piezoelectric Bimorphs With Extenders in Optical Scanners*, 2000 IEEE Ultrasonics Symposium, J. G. Smits, et al., pp. 1093-1096.

*Design Optimization & Improved Performance on TH Elink Beam Driven, Miniaturized Scanning Mirror Device*, 2000 IEEE, N. Konno, et al., pp. 11-12.

*PZT Thin-Film Actuator Driven Micro Optical Scanning Sensor by 3D Integration of Optical and Mechanical Devices*, M. Ikeda, et al., Central R & D Laboratory, 1999 IEEE, pp. 435-440.

*A Piezoelectric Actuated Scanning Mirror System Utilizing A Type One Control Loop*, M. Harris, IEEE Proceedings—1989 Southeastcon, pp. 1267-1274.

*Miniature Piezoelectric Actuators: Design Concept, Fabrication and Performance Evaluation*, C. K. Lee, et al.; Smart Mater, Struct. 7(1998) pp. 312-326.

* cited by examiner

INERTIAL DRIVE SCANNING ARRANGEMENT AND METHOD

CROSS-REFERENCE TO RELATED APPLICATION

This application is a continuation-in-part of U.S. patent application Ser. No. 10/387,878, filed Mar. 13, 2003, now U.S. Pat. No. 7,182,262.

BACKGROUND OF THE INVENTION

1. Field of the Invention

The present invention generally relates to a light scanning arrangement for and method of repetitively scanning targets, for example, optical codes, and, more particularly, to operating such a scanning arrangement under low electrical power conditions to minimize usage of electrical power and at high scan rates.

2. Description of the Related Art

Various optical code readers have been developed heretofore to read optical codes, such as bar code symbols applied to objects in order to identify each object by optically reading the symbol thereon. The bar code symbol itself is a coded pattern comprised of a series of bars of various widths and spaced apart from one another to bound spaces of various widths, the bars and spaces having different light reflecting properties. The readers electro-optically decoded the coded patterns to multiple digit representations descriptive of the objects. Readers of this general type have been disclosed, for example, in U.S. Pat. No. 4,251,798.

As disclosed in the known art, a particularly advantageous embodiment of such a reader resided, inter alia, in emitting a light beam, preferably a laser beam, emitted from a light source, preferably a gas laser or a laser diode, and in directing the laser beam to a symbol to be read. En route to the symbol, the laser beam was directed to, and reflected off, a light reflector of a scanning component. The scanning component moved the reflector in a cyclical fashion and caused the laser beam to repetitively scan the symbol. The symbol reflected the laser beam incident thereon. A portion of the incident light reflected off the symbol was collected and detected by a detector component, e.g., a photodiode, of the reader. The photodiode had a field of view, and the detected light over the field of view was decoded by electrical decode circuitry into data descriptive of the symbol for subsequent processing. The cyclically movable reflector swept the laser beam across the symbol and/or swept the field of view during scanning at a scan rate.

Several different types of scanning components were known in the art. For example, U.S. Pat. No. 4,251,798 disclosed a polygonally-shaped multi-faced wheel having mirrored outer surfaces on each of its faces. The wheel was mounted for rotation so that each mirrored outer surface was, in turn, positioned in an optical path along which the incident laser beam was directed to the symbol to be scanned. Other scanning components disclosed in U.S. Pat. No. 4,251,798 were a bimorph or ferroelectric-type oscillating element, as well as a speaker-type oscillating element, each element having an oscillatable mirror.

U.S. Pat. No. 4,387,297 and U.S. Pat. No. 4,496,831 disclosed a scanning component including an electric motor operative for reciprocatingly oscillating a reflector in opposite circumferential directions relative to an output shaft of the motor. U.S. Pat. No. 4,387,297 also disclosed a penta-bimorph scanning component. U.S. Pat. No. 5,099,110 disclosed a power saving scanning component wherein a scan mirror was oscillated by releasing stored energy in a hinge.

The light reflector need not have been a single planar mirror, but, as described in U.S. Pat. No. 4,760,248, could have been an optical component having a construction which was part concave and part planar. The reflector could be driven by an electrical motor in alternate circumferential directions along arc lengths less than 360° as described in U.S. Pat. No. 4,496,831, or, in a variant construction, could be rotated completely around an axis as described in U.S. Pat. No. 4,816,661.

In still another variant construction, as described in U.S. Pat. No. 5,144,120, rather than using a reflector to effect the scanning action, the reflector was eliminated altogether in a so-called "mirrorless" design in which one or more of the other reader components were jointly or separately moved relative to one another to effect a reciprocating scanning action driven by an electrical motor. The other reader components included a light source component, e.g., a laser diode, and/or optical components, e.g., a focusing lens, and/or the photodetector component, e.g., a photodiode.

In all of the above-described scanning components, the scan rate was relatively low, on the order of less than 100 Hz. To increase the scan rate to a range from 350 Hz to 1200 Hz, U.S. Pat. No. 5,412,198 disclosed a resonance asymmetric scan element in which a scan mirror was oscillated by means of magnetic field interaction between a permanent magnet and an electromagnetic coil.

It was known in the art to mount the permanent magnet or the electromagnetic coil directly on the scan mirror to form a magnetically-driven oscillatable mirror assembly. It was also known to mount electrodes directly on the scan mirror in an electrostatically-driven oscillatable mirror assembly. This, however, increased the mass of the oscillatable assembly, thereby requiring more electrical power to drive the assembly and limiting the scan rate. In readers of the hand-held type, wherein electrical power is supplied by on-board batteries, a high electrical power requirement reduces the working lifetime of the batteries. Also, there are many applications, not limited to reading bar code symbols, where a high scan rate in excess of 1200 Hz and, indeed, at inaudible frequencies greater than 20 kHz is desired.

SUMMARY OF THE INVENTION

Objects of the Invention

One object of this invention is to advance the state of the art of readers for electro-optically reading optical codes such as bar code symbols.

Another object of this invention is to minimize electrical power consumption of such readers.

Still another object of this invention is to increase the scan rate of such readers.

Yet another object of this invention is to provide a low power, high scan rate, arrangement for scanning light in a myriad of applications not limited to reading optical codes, but, by way of non-limiting example, for projecting an image on a display surface, or for capturing an image from a target.

FEATURES OF THE INVENTION

In keeping with these objects and others which will become apparent hereinafter, one feature of this invention resides, briefly stated, in a light scanning arrangement and method, in which a movable frame supports an oscillatable scan element for reflecting light incident thereon. A hinge extending along a hinge axis is connected between the frame and the scan element. A base plate, for example, a printed circuit board, supports the frame. An inertial drive is operative for directly moving one of the frame and the base plate and, by inertia, for indirectly oscillating the scan element to scan the incident light.

In accordance with this invention, the scan element has a low mass. There is no permanent magnet, or electromagnetic coil, or electrode, or like weight mounted on, or connected to, the scan element and, hence, the scan element is free to be moved at high scan rates greater than 1 kHz and preferably on the order of 20 kHz and above.

In the preferred embodiment, the frame, the hinge and the scan element are fabricated as a one-piece construction from a generally planar, silicon substrate. A specular coating is preferably coated on the scan element. The frame preferably surrounds the scan element and lies in a common plane therewith in a rest position. The scan element has a thickness on the order of 150μ and due to the high quality (Q) factor of the silicon, the scan element has a desirable low damping characteristic.

The oscillation of the scan element is achieved by inertial forces. The scan element is not directly driven. Instead, the movable frame or the base plate is directly driven. In one embodiment, the frame can be oscillated about the hinge axis which extends through a center of mass of the scan element. In another embodiment, the hinge axis can be spaced along a transverse direction parallel to an axis passing through the center of mass, in which case, moving the frame in a linear direction generally perpendicular to the transverse direction will cause the scan element to oscillate about the hinge axis.

Preferably, the inertial drive is fabricated from one or more piezoelectric devices operatively connected to the frame. Each device generates a mechanical force when electrically energized. In one particularly advantageous embodiment, two piezoelectric devices are connected to the frame at opposite sides of the hinge axis. In operation, one device pushes one side of the frame in one circumferential direction about the hinge axis, while the other device simultaneously pulls the opposite side of the frame in the opposite circumferential direction. These push-pull forces are alternately transmitted through the hinge to the scan element. Thus, the scan element, which starts out in a state of rest, receives force from the moving frame or the moving base plate, and the scan element begins to move in the same path and direction as the received force. The scan element oscillates at its resonant frequency provided the push-pull forces are generated at the same frequency. The amount of motion required from the frame is proportional to the amount of desired motion of the scan element divided by the Q factor. In a preferred embodiment, the frame stroke is under 1 μm, and the scan element moves through an arc of ±8 degrees mechanical.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
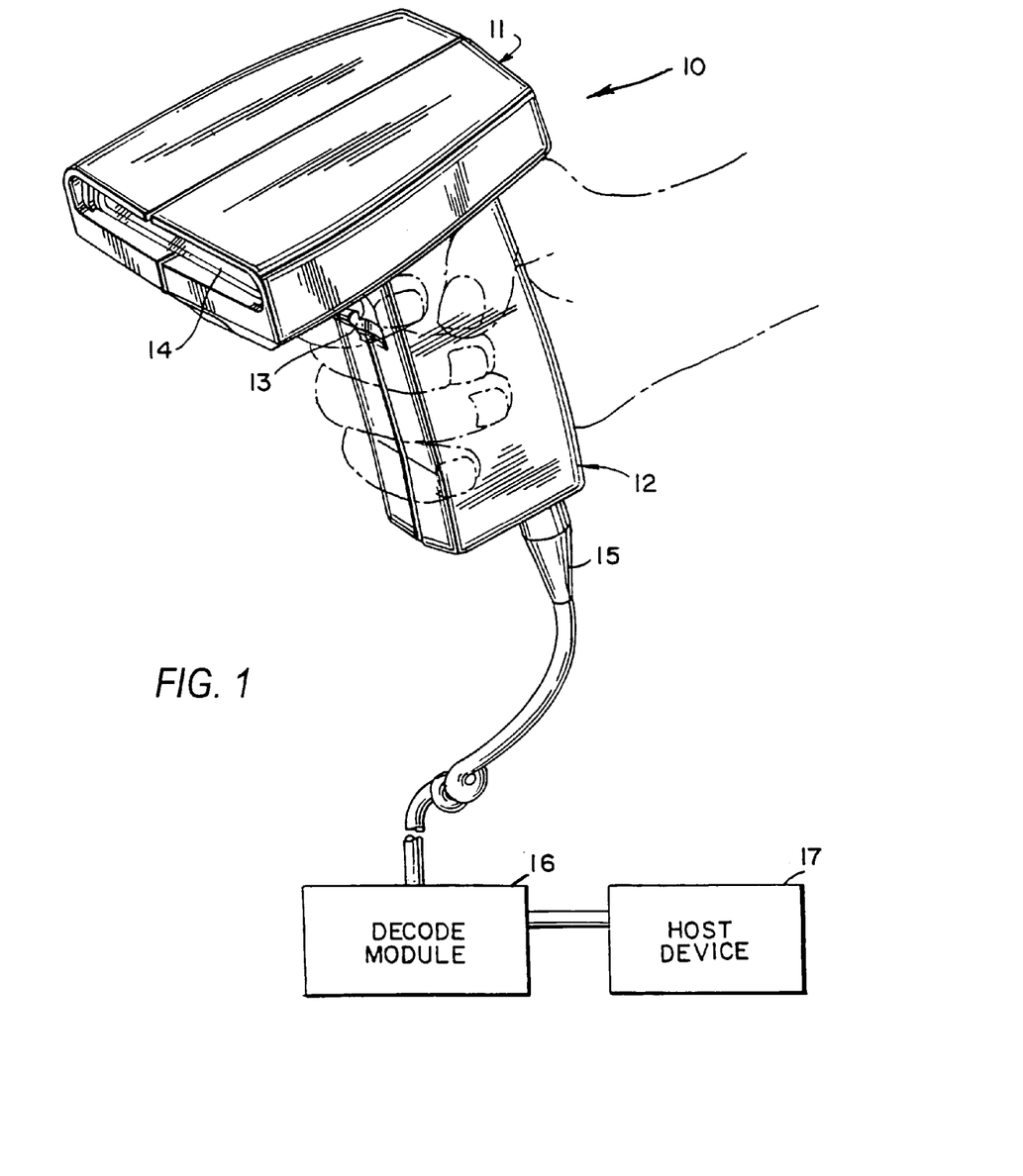
FIG. 1 is a perspective view of a hand-held reader for electro-optically reading optical codes.

Referring now to the drawings, reference numeral 10 generally identifies a hand-held, gun-shaped head having a barrel 11 and a handle 12. A manually-operable trigger 13 is situated below the barrel 11 on an upper, forwardly-facing part of the handle 12. As known from the above-identified patents, a light source component, typically, but not necessarily, a laser, is mounted inside the head 10. The light source component emits a light beam along a transmission path which extends outwardly through a window 14 that faces indicia, e.g., bar code symbols, to be read. Also mounted within the head is a photodetector component, e.g., a photodiode, having a field of view, and operative for collecting reflected light returning through the window 14 along a return path from the symbol.

A scanning component is mounted within the head 10, and is operative for scanning the symbol and/or the field of view of the photodetector. The scanning component typically, but not necessarily, includes at least one scan element or light reflector positioned in the transmission path and/or the return path. The scan element is driven by an electrically-operated drive in alternate circumferential directions relative to an axis.

The photodetector generates an electrical analog signal indicative of the variable intensity of the reflected light. This analog signal is converted into a digital signal by an analog-to-digital converter circuit. This digital signal is conducted, according to one embodiment, along an electrical cable 15 to a decode module 16 located exteriorly of the head 10. The decode module 16 decodes the digital signal into data descriptive of the symbol. An external host device 17, usually a computer, serves mainly as a data store in which the data generated by the decode module 16 is stored for subsequent processing.

In other embodiments, the decode module 16 is mounted within the head, and an on-board memory is used to store the decoded signal for subsequent download, either by a wired or wireless connection.

In use, each time a user wishes to have a symbol read, the user aims the head at the symbol and pulls the trigger 13 to initiate reading of the symbol. The symbol is repetitively scanned a plurality of times per second at a scan rate. As soon as the symbol has been successfully decoded and read, the scanning action is automatically terminated, thereby enabling the scanner to be directed to the next symbol to be read in its respective turn.

Figures 2, 3:
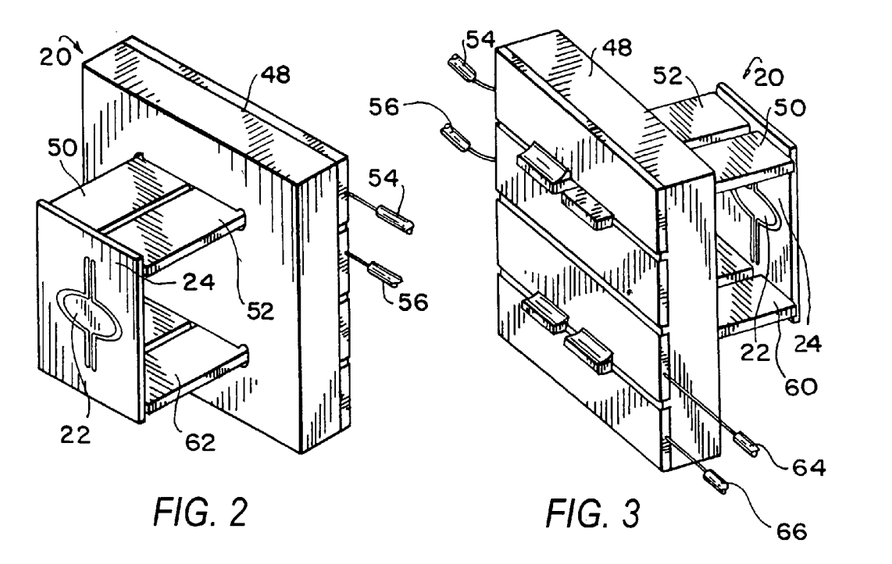
FIG. 2 is a front perspective view of a preferred embodiment of a light scanning arrangement for use in the reader of FIG. 1.
FIG. 3 is a rear perspective view of the embodiment of FIG. 2.
Figure 4:
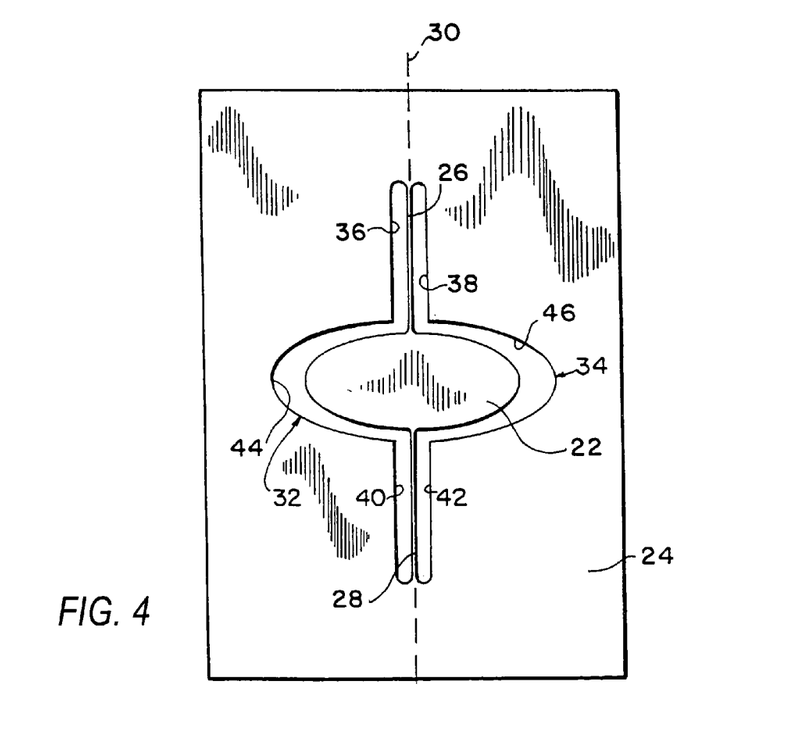
FIG. 4 is an enlarged front view of a detail of the arrangement of FIG. 2.

Turning now to FIGS. 2-4, a light scanning arrangement 20 suitable for scanning the light beam and/or the field of view in a system of the type exemplified by FIG. 1 for electro-optically reading optical codes is depicted. Arrangement 20 includes an oscillatable scan element 22, especially a planar mirror, for reflecting light incident thereon. The light may come from a light source for reflection to a code to be scanned and read, or the light may come from a target to be scanned and imaged over a field of view.

Arrangement 20 also includes a movable frame 24 for supporting the scan element 22 by means of a hinge extending along a hinge axis 30. As best seen in FIG. 4, the hinge includes a pair of collinear hinge portions 26, 28 connected between opposite regions of the scan element 22 and opposite regions of the frame. The frame 24 need not surround the scan element, as shown.

The frame, hinge portions and scan element are fabricated of a one-piece, generally planar, silicon substrate which is approximately 150μ thick. The silicon is etched to form omega-shaped slots 32, 34 having upper parallel slot sections 36, 38, lower parallel slot sections 40, 42, and U-shaped central slot sections 44, 46. Hinge portion 26 is located between slot sections 36, 38. Hinge portion 28 is located between slot sections 40, 42. The scan element 22 preferably has an oval shape and is free to move in the slot sections 44, 46. In the preferred embodiment, the dimensions along the axes of the oval-shaped scan element measure 749μ×1600μ. Each hinge portion measure 27μ in width and 1130μ in length. The frame has a rectangular shape measuring 3100μ in width and 4600μ in length.

An inertial drive is mounted on a generally planar, printed circuit board 48 and is operative for directly moving the frame and, by inertia, for indirectly oscillating the scan element 22 about the hinge axis 30. One embodiment of the inertial drive includes a pair of piezoelectric transducers 50, 52 extending perpendicularly of the board 48 and into contact with spaced apart portions of the frame 24 at either side of hinge portion 26. An adhesive may be used to insure a permanent contact between one end of each transducer and each frame portion. The opposite end of each transducer projects out of the rear of the board 48 and is electrically connected by wires 54, 56 to a periodic alternating voltage source (not shown).

In use, the periodic signal applies a periodic drive voltage to each transducer and causes the respective transducer to alternatingly extend and contract in length. When transducer 50 extends, transducer 52 contracts, and vice versa, thereby simultaneously pushing and pulling the spaced apart frame portions and causing the frame to twist about the hinge axis 30. The drive voltage has a frequency corresponding to the resonant frequency of the scan element. The scan element is moved from its initial rest position until it also oscillates about the hinge axis at the resonant frequency. In a preferred embodiment, the frame and the scan element are about 150μ thick, and the scan element has a high Q factor. A movement on the order of 1μ by each transducer can cause oscillation of the scan element at scan rates in excess of 20 kHz.

Another pair of piezoelectric transducers 60, 62 extends perpendicularly of the board 48 and into permanent contact with spaced apart portions of the frame 24 at either side of hinge portion 28. Transducers 60, 62 serve as feedback devices to monitor the oscillating movement of the frame and to generate and conduct electrical feedback signals along wires 64, 66 to a feedback control circuit (not shown).

Although light can reflect off an outer surface of the scan element, it is desirable to coat the surface of the element 22 with a specular coating made of gold, silver, aluminum, or like material.

Figure 5:
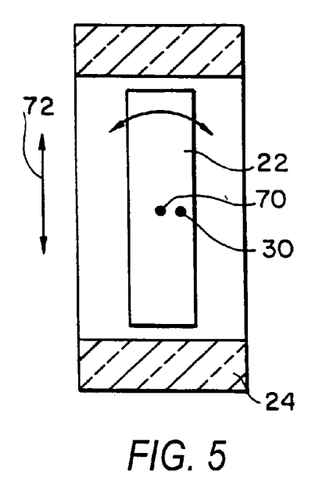
FIG. 5 is a schematic view of another embodiment of a light scanning arrangement in accordance with this invention.
Figure 6:
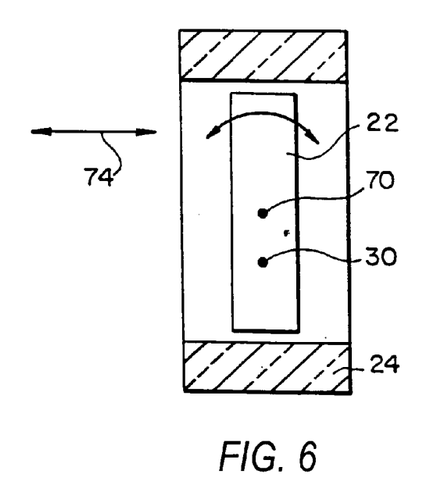
FIG. 6 is a schematic view of yet another embodiment of a light scanning arrangement in accordance with this invention.

As described so far, the hinge axis 30 is collinear with an axis of symmetry extending through a center of mass of the scan element, thereby resulting in a balanced scan element which oscillates when the frame is oscillated. This invention also contemplates, as shown in the schematic views of FIGS. 5 and 6, a weight imbalanced scan element 22 in which the hinge axis 30 is spaced a transverse distance away from an axis of symmetry 70 extending through the center of mass of the scan element. In FIG. 5, the hinge axis 30 is spaced horizontally away from the axis 70, whereas, in FIG. 6, the hinge axis 30 is spaced vertically away from the axis 70. If the frame 24 in FIG. 5 is moved vertically in the direction of double-headed arrows 72, then the scan element 22 will oscillate about the hinge axis 30. If the frame 24 in FIG. 6 is moved horizontally in the direction of double-headed arrow 74, then the scan element 22 will oscillate about the hinge axis 30. Thus, FIGS. 5 and 6 demonstrate that the scan element can be oscillated even by linear movement of the frame.

Figure 7:
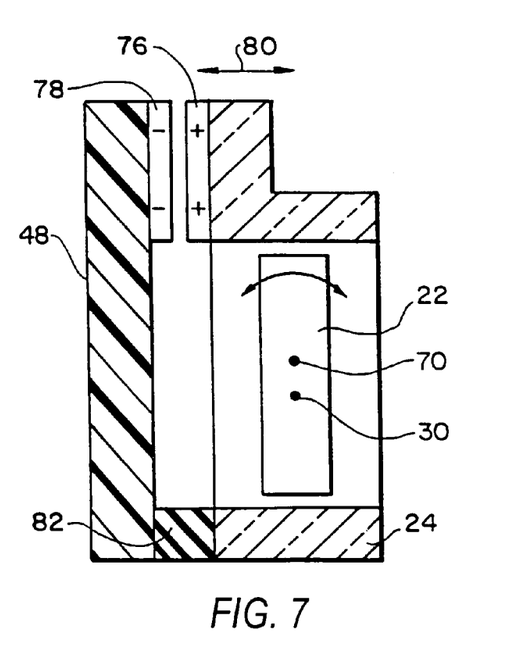
FIG. 7 is a schematic view of a further embodiment of a light scanning arrangement in accordance with this invention.

The movement of the frame need not be obtained from piezoelectric transducers, but instead, other drives may be employed. For example, FIG. 7 depicts an electrostatic drive in which an electrode 76 is mounted on the frame 24, and another electrode 67 is mounted on the board 48. A spacer 82 supports the frame 24 away from the board 48. By causing the electrodes to have opposite polarities, the frame 24 is moved horizontally in the direction of the double-headed arrow 80, and the scan element 22 oscillates in a manner analogous to that described above in connection with FIG. 6. Magnetic drives could also be used.

The light scanning component 20 described herein is not intended to be limited to applications involving reading coded indicia. Another important application resides in image projection in which a light beam is swept in a raster pattern of scan lines across a viewing surface, and in which the light beam is only rendered visible at selected positions along each scan line. Reference can be had to U.S. patent application Ser. No. 09/604,196 and U.S. Pat. No. 6,655,597, both assigned to the assignee of the instant application, for details of such image projection displays.

Figure 8:
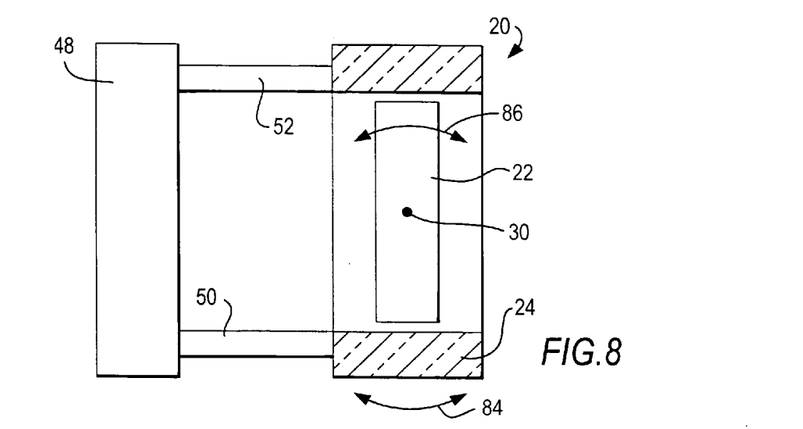
FIG. 8 is a schematic view of an additional light scanning arrangement in accordance with this invention.

FIG. 8 schematically depicts the light scanning component 20 as seen from above, in which the piezoelectric transducers 50, 52 are connected at their first ends to the printed circuit board or base plate 48, and at their opposite second ends to the frame 24. The transducers have at least two functions, namely to twist the frame 24 to oscillate in the directions of the doubleheaded arrow 84 and, in turn, to cause the mirror 22 to oscillate in the directions of the doubleheaded arrow 86, as well as to mechanically support the frame 24 and, in turn, to support the mirror 22. However, the physical connections of the transducers 50, 52 to the base plate 48 result in lost motion, because a non-negligible part of the stroke (extension or contraction) is transferred to the base plate 48 and, as a result, not all of the stroke is used to drive the frame 24.

Figure 9:
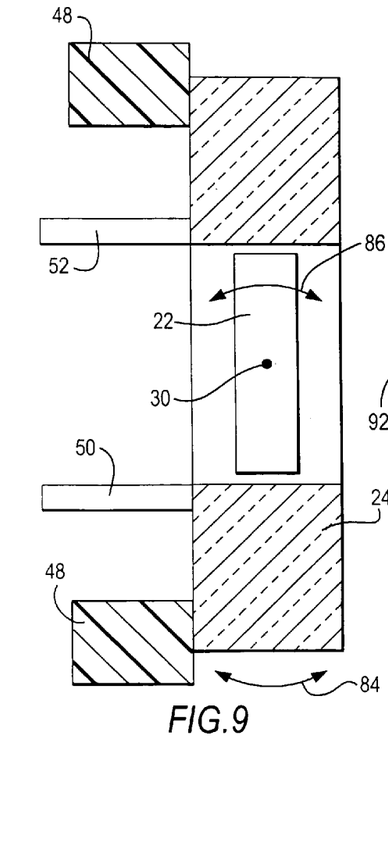
FIG. 9 is a schematic view of another light scanning arrangement in accordance with this invention.

FIG. 9 depicts a modification in which the frame 24 is directly supported not by the transducers 50, 52, but by the base plate 48. The second ends of the transducers are connected, as before, to the frame to twist the same. However, the opposite, first ends of the transducers are not physically connected to the base plate, but are electrically connected to the wires 54, 56. Thus, the transducers have their first ends unrestrained by the base plate.

Figure 10:
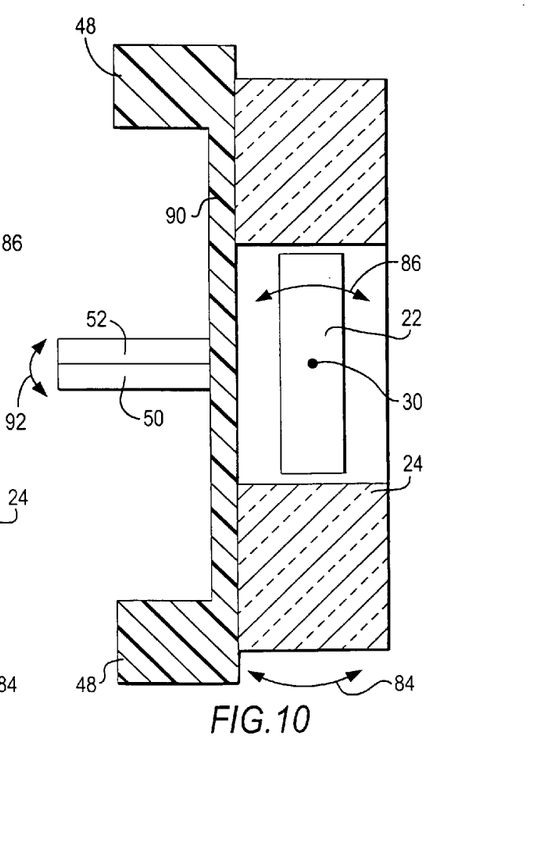
FIG. 10 is a schematic view of yet another light scanning arrangement in accordance with this invention.

Similarly, FIG. 10 depicts another modification in which the first ends of the transducers 50, 52 are unrestrained by the base plate, and in which the second ends of the transducers are mechanically connected to a thin portion 90 of the base plate 48. The frame 24 is mechanically connected to the thin portion 90.

In both embodiments of FIGS. 9-10, the frame 24 is directly mounted on the base plate. This is a less expensive, more precise and more reliable mounting as compared to the embodiment of FIG. 8 in which the frame 24 is directly mounted on, and aligned with, the transducers.

FIG. 10 also depicts a different drive arrangement for the transducers. Rather than separating the transducers 50, 52 and having them alternately extend and contract on opposite sides of the hinge axis 30, the transducers 50, 52 of FIG. 10 are laminated together and, in operation, bend angularly in the directions of the doubleheaded arrow 92. The laminated transducers 50, 52, together bend as a unit in a manner resembling a thermostatic element.

Figure 11:
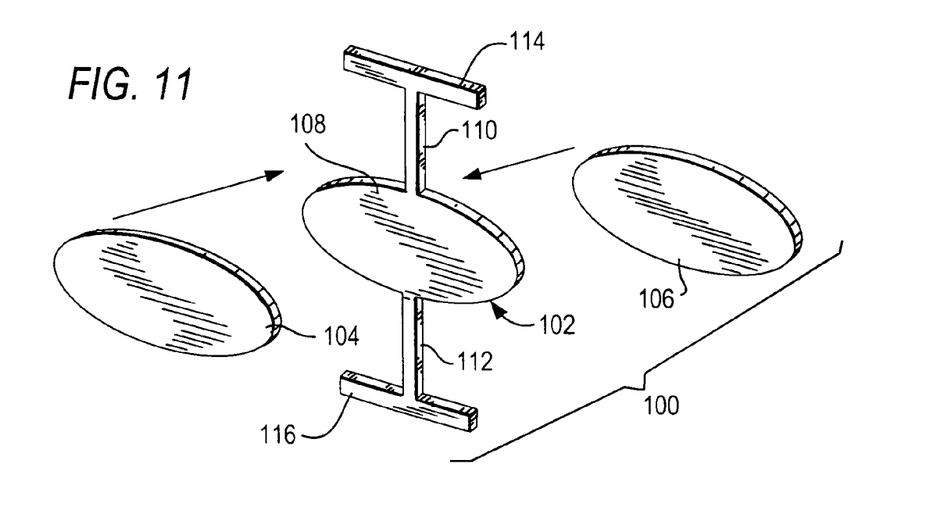
FIG. 11 is a perspective view of a detail of a light scanning arrangement in accordance with this invention.

FIG. 11 depicts a scan component 100 which can replace the scan mirror 22 and the frame 24. Scan component 100 includes a foil member 102, preferably made from metal, and a pair of mirrors 104, 106, preferably made of glass. The foil member 102 has a central section 108 on opposite sides of which the mirrors 104, 106 are mounted for joint oscillation, a pair of colinear hinges 110, 112, and frame sections 114, 116 on which the pairs of transducers 50, 52 and 60, 62 are respectively affixed. The foil member 102 is etched so that each hinge is preferably about 70 µm wide and 120 µm thick. Stainless steel has a stress limit and a Young's modulus comparable to the silicon mirror 22 and frame 24. The higher specific weight of steel affects dynamic deformations, but these are of little importance for small, sub-millimeter mirrors. The use of two glass mirrors 104, 106, instead of one, enables balanced oscillations.

The etched metal scan component 100 can be made less expensively than a silicon-based scan component, especially if the foil member 102 is glued to glass plates having multiple mirrors.

Figure 12:
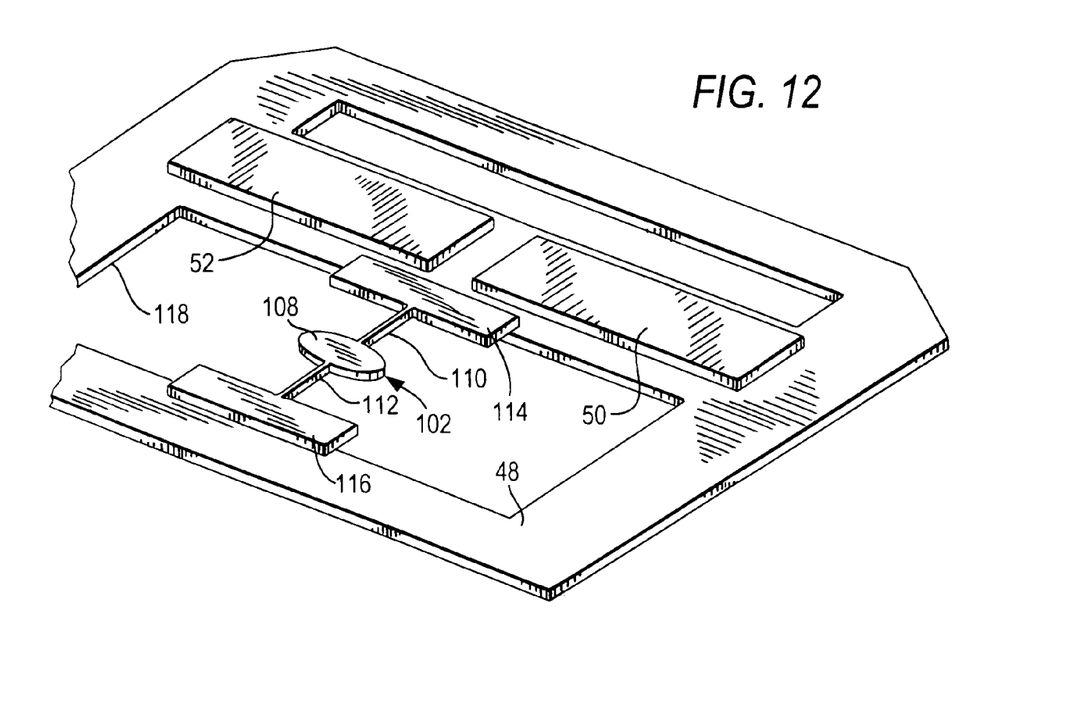
FIGS. 12-14 are respective perspective views of the detail of FIG. 11 mounted on printed circuit boards.

FIG. 12 depicts the scan component 100 of FIG. 11 mounted on an upper side of the base plate 48, with the piezoelectric transducers 50, 52 mounted on the same upper side. Preferably, the transducers 50, 52 are glued and/or soldered in planar surface area contact with the upper side. In operation, one transducer contracts, while the other extends, and vice versa, thereby acting as a bimorph in which the plate 48 deforms into an S-shape and, in turn, twists the frame sections 114, 116, as well as causing the central section 108 to oscillate at its resonant frequency. The plate 48 has a cutout 118 in which the central section 108 is free to oscillate. The mirrors 104, 106 have been removed from FIG. 12 for clarity.

Figure 13:
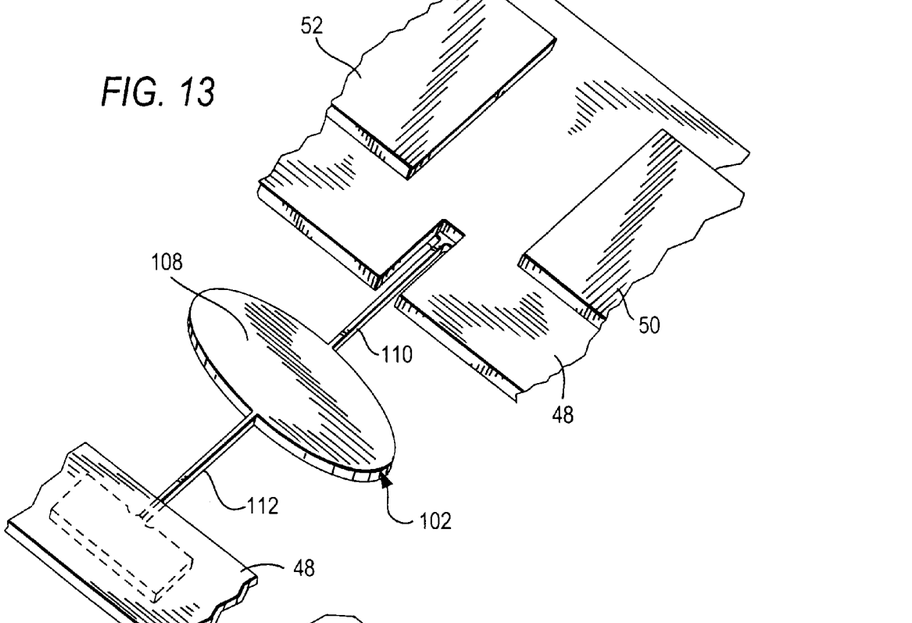

FIG. 13 depicts the scan component 100 of FIG. 11 mounted on a lower side of the base plate 48, with the transducers 50, 52 mounted on the upper side of the base plate. The operation is the same as described for FIG. 12. The mirrors 104, 106 have been removed from FIG. 13 for clarity.

Figure 14:
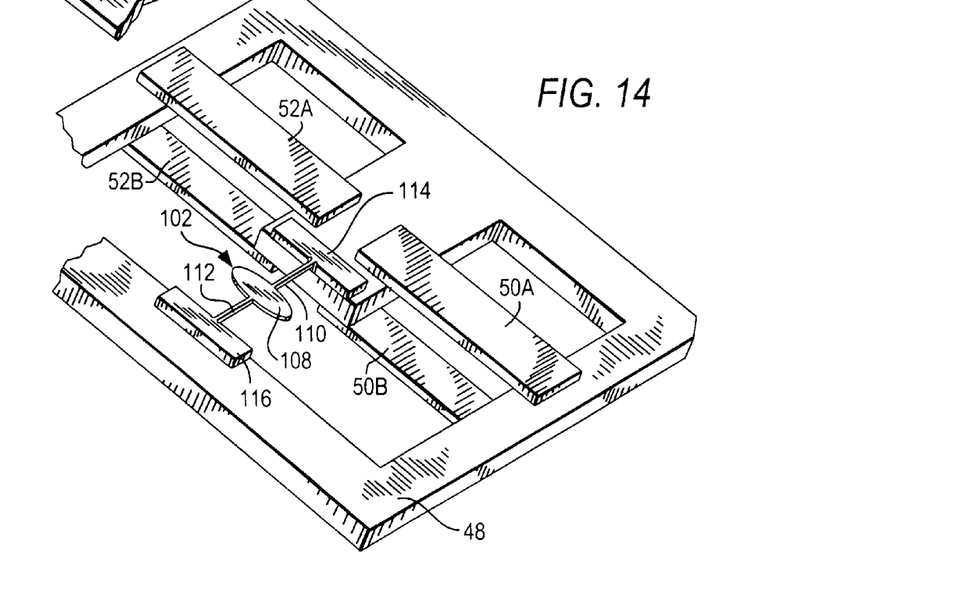

FIG. 14 depicts the scan component 100 mounted on an upper side of the base plate by adhering the frame sections 114, 116 thereto. A first pair of transducers 50A, 52A is also mounted on the upper side of the base plate, as described in connection with the embodiments of FIGS. 12-13. A second pair of transducers 50B, 52B is mounted on the lower side of the base plate. Each transducer expands or contracts when electrically energized.

In operation, transducers 52A and 50B are actuated to cause them to expand, while transducers 50A and 52B are simultaneously actuated to cause them to retract, and vice versa. This causes the plate 48 to deform and, in turn, causes to central section 108 to resonate. The mirrors 104, 106 have not been shown in FIG. 14 to simplify the drawing.

It will be understood that each of the elements described above, or two or more together, also may find a useful application in other types of constructions differing from the types described above.

While the invention has been illustrated and described as embodied in an inertial drive scanning arrangement and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A light scanning arrangement, comprising:
   a) an oscillatable scan element for reflecting light incident thereon, the scan element having an axis of symmetry extending through a center of mass of the scan element;
   b) a movable frame for supporting the scan element;
   c) a hinge extending along a hinge axis that is spaced along a transverse direction parallel to the axis of symmetry, and connected between the frame and the scan element;
   d) a base plate for supporting the frame; and
   e) an inertial drive for directly moving one of the frame and the base plate and, by inertia, for indirectly oscillating the scan element about the hinge axis to scan the incident light the drive being operative for directly linearly moving the frame in a drive direction generally perpendicular to the transverse direction.

2. The arrangement of claim 1, wherein the scan element, the frame and the hinge are a one-piece, generally planar, silicon substrate.

3. The arrangement of claim 2, wherein the scan element has a specular coating.

4. The arrangement of claim 1, wherein the hinge includes two elongated hinge portions extending along the hinge axis, each hinge portion having one end region connected to the frame and an opposite end region connected to the scan element.

5. The arrangement of claim 1, wherein the frame surrounds the scan element and lies in a common plane therewith in a rest position of the arrangement.

6. The arrangement of claim 1, wherein the drive is operative to oscillate the scan element at frequencies in excess of 1 kHz and over arcuate distances on the order of ±8° mechanical.

7. The arrangement of claim 1, wherein the drive includes at least one piezoelectric device connected to the frame, and operative for mechanically moving the frame in opposite circumferential directions about the hinge axis when electrically energized by a periodic drive signal.

8. The arrangement of claim 1, wherein the drive includes at least one piezoelectric device connected to the base plate, and operative for mechanically moving the base plate in opposite circumferential directions about the hinge axis when electrically energized by a periodic drive signal.

9. The arrangement of claim 1, wherein the drive includes a pair of piezoelectric devices connected to the frame at opposite sides of the hinge axis, and operative for mechanically pushing and pulling, respectively, on the opposite sides of the frame in opposite circumferential directions about the hinge axis when electrically energized by a periodic drive signal.

10. The arrangement of claim 1, wherein the base plate is a printed circuit board.

11. A light scanning method, comprising the steps of:
a) reflecting light incident on an oscillatable scan element that has an axis of symmetry extending through a center of mass of the scan element;
b) supporting the scan element on a movable frame;
c) connecting a hinge extending along a hinge axis and connected between the frame and the scan element, the hinge axis being spaced along a transverse direction parallel to the axis of symmetry;
d) supporting the frame on a base plate; and
e) directly moving one of the frame and the base plate and, by inertia, indirectly oscillating the scan element about the hinge axis to scan the incident light, the moving step being performed by directly linearly moving the frame in a drive direction generally perpendicular to the transverse direction.

12. The method of claim 11, and fabricating the scan element, the frame and the hinge of a one-piece, generally planar, silicon substrate.

13. The method of claim 12, and coating the scan element with a specular coating.

14. The method of claim 11, wherein the moving step is performed by oscillating the scan element at frequencies in excess of 1 kHz and over arcuate distances on the order of ±8° mechanical.

15. The method of claim 11, and connecting at least one piezoelectric device to the frame, and wherein the moving step is performed by mechanically moving the frame in opposite circumferential directions about the hinge axis when electrically energized by a periodic drive signal.

16. The method of claim 11, and connecting at least one piezoelectric device to the base plate, and wherein the moving step is performed by mechanically moving the base plate in opposite circumferential directions about the hinge axis when electrically energized by a periodic drive signal.

17. The method of claim 11, and connecting a pair of piezoelectric devices to the frame at opposite sides of the hinge axis, and wherein the moving step is performed by mechanically pushing and pulling, respectively, on the opposite sides of the frame in opposite circumferential directions about the hinge axis when electrically energized by a periodic drive signal.

* * * * *